(12) United States Patent
Cho et al.

(10) Patent No.: US 11,028,711 B2
(45) Date of Patent: Jun. 8, 2021

(54) SUPERCRITICAL CARBON DIOXIDE POWER GENERATION SYSTEM INCLUDING DRY GAS SEAL AND METHOD OF OPERATING THE SAME

(71) Applicant: KOREA INSTITUTE OF ENERGY RESEARCH, Daejeon (KR)

(72) Inventors: Jun Hyun Cho, Sejong-si (KR); Bong Su Choi, Daejeon (KR); Ho Sang Ra, Daejeon (KR); Hyung Ki Shin, Sejong-si (KR); Jong Jae Cho, Sejong-si (KR); Beom Joon Lee, Sejong-si (KR); Chul Woo Roh, Sejong-si (KR); Gil Bong Lee, Daejeon (KR); Young Jin Baik, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 154 days.

(21) Appl. No.: 16/453,655

(22) Filed: Jun. 26, 2019

(65) Prior Publication Data

US 2020/0131920 A1 Apr. 30, 2020

(30) Foreign Application Priority Data

Oct. 30, 2018 (KR) .................... 10-2018-0130336

(51) Int. Cl.
*F01D 11/00* (2006.01)
*F02C 3/04* (2006.01)
(Continued)

(52) U.S. Cl.
CPC .......... *F01D 11/003* (2013.01); *F01D 11/005* (2013.01); *F01D 11/04* (2013.01);
(Continued)

(58) Field of Classification Search
CPC ..... F01K 7/32; F01K 25/103; F16J 15/40–43; F02C 1/10; F02C 1/105
See application file for complete search history.

(56) References Cited

U.S. PATENT DOCUMENTS

| 10,787,907 | B2 * | 9/2020 | Tsuruta | F01D 11/001 |
| 2014/0023478 | A1 * | 1/2014 | Maeda | F01D 25/26 415/1 |

(Continued)

FOREIGN PATENT DOCUMENTS

| KR | 10-1138223 B1 | 4/2012 |
| KR | 10-2016-0070035 A | 6/2016 |
| KR | 10-1882137 B1 | 7/2018 |

*Primary Examiner* — Laert Dounis
(74) *Attorney, Agent, or Firm* — Birch, Stewart, Kolasch & Birch, LLP

(57) ABSTRACT

According to the present invention, part of carbon dioxide heated by a heater is supplied to a dry gas seal portion of a compressor so that a device for pressurizing and heating a seal gas is not additionally required, configuration can be simplified and cost can be reduced. In addition, a seal gas flow path includes a low-temperature seal gas flow path and a high-temperature seal gas flow path so that, in an initial driving mode, carbon dioxide heated by a high-temperature portion of the heater is used as a seal gas and in a turbine-driving mode, carbon dioxide heated by a low-temperature portion of the heater is used as a seal gas and thus a more efficient operation can be performed.

11 Claims, 3 Drawing Sheets

(51) Int. Cl.
*F01K 7/32* (2006.01)
*F01D 11/04* (2006.01)
*F01K 25/10* (2006.01)
*F01D 25/18* (2006.01)
*F02C 1/10* (2006.01)
*F16J 15/40* (2006.01)

(52) U.S. Cl.
CPC .............. *F01D 25/183* (2013.01); *F01K 7/32* (2013.01); *F01K 25/103* (2013.01); *F02C 1/10* (2013.01); *F02C 3/04* (2013.01); *F05D 2240/55* (2013.01); *F16J 15/40* (2013.01)

(56) References Cited

U.S. PATENT DOCUMENTS

| | | |
|---|---|---|
| 2014/0103661 A1 | 4/2014 | Kacludis et al. |
| 2015/0330261 A1* | 11/2015 | Held .................... F01D 11/003 60/326 |
| 2018/0266566 A1 | 9/2018 | Cha |

* cited by examiner

SUPERCRITICAL CARBON DIOXIDE POWER GENERATION SYSTEM INCLUDING DRY GAS SEAL AND METHOD OF OPERATING THE SAME

CROSS-REFERENCE TO RELATED PATENT APPLICATIONS

This application claims the benefit of Korean Patent Application No. 10-2018-0130336, filed on Oct. 30, 2018, in the Korean Intellectual Property Office, the disclosure of which is incorporated herein in its entity by reference.

BACKGROUND OF THE INVENTION

1. Field of the Invention

The present invention relates to a supercritical carbon dioxide power generation system including a dry gas seal and a method of operating the same, and more particularly, to a supercritical carbon dioxide power generation system including a dry gas seal in which carbon dioxide used as the dry gas seal is supplied from an inside of the power generation system so that the configuration of the supercritical carbon dioxide power generation system can be more simplified, and a method of operating the same.

2. Description of the Related Art

Supercritical carbon dioxide power generation systems are power producing systems that drive a turbine by heating carbon dioxide compressed with a super-high pressure that is equal to or higher than a critical pressure at a high temperature.

An impeller side of a compressor of a supercritical carbon dioxide power generation system is in a high pressure state of 74 bar or higher that is a supercritical state condition, and a bearing side of the compressor thereof is in an atmospheric pressure state. Thus, a working fluid leaks along a shaft due to a pressure difference between both sides.

Thus, in order to minimize leakage of the working fluid that inevitably occurs in a high-pressure operating condition, a dry gas seal (DGS) is applied between the impeller and the bearing. In the DGS, a gas is supplied to a seal portion so that sealing effects can be achieved, and the same carbon dioxide as the working fluid is mainly used as a seal gas.

However, when the DGS is applied, the pressure of the seal gas at the high pressure drops to the atmospheric pressure on a surface of the seal portion so that temperature is quickly fallen on the surface of the seal portion and the seal gas is dry-iced. In order to prevent this problem, the seal gas needs to be heated and injected, and when the seal gas is injected, the seal gas needs to be injected at a higher pressure than a pressure of a rear surface of the impeller.

Thus, since the seal gas needs to be heated and pressurized at a predetermined temperature and under a predetermined pressure or higher, an auxiliary compressor and an auxiliary heater are additionally required to heat and pressurize the seal gas.

SUMMARY OF THE INVENTION

The present invention provides a supercritical carbon dioxide power generation system including a dry gas seal in which a seal gas is more easily injected so that the configuration of the supercritical carbon dioxide power generation system can be simplified and cost can be reduced, and a method of operating the same.

According to an aspect of the present invention, there is provided a supercritical carbon dioxide power generation system including a dry gas seal, including a turbine, a cooler, a compressor, a heater, a carbon dioxide injecting portion injecting carbon dioxide as a working fluid from a carbon dioxide tank into an intake side of the compressor, a heater flow path provided in the heater and configured to introduce and heat carbon dioxide generated in the compressor and then to discharge carbon dioxide to the turbine, a seal gas flow path diverged from the heater flow path and guiding at least part of carbon dioxide heated on the heater flow path to be injected into a dry gas seal portion of the compressor and to be used as a seal gas, a seal gas valve installed on the seal gas flow path and opening/closing of the seal gas flow path, and a controller controlling an amount of an opening degree of the seal gas valve according to a temperature of carbon dioxide heated by the heater.

According to another aspect of the present invention, there is provided a method of controlling a supercritical carbon dioxide power generation system including a dry gas seal, the method including, in an initial driving mode in which injecting of carbon dioxide from a carbon dioxide injecting portion into a compressor starts, operating a heater, opening a high-temperature seal gas flow path diverged from a high-temperature portion of a heater flow path that passes through the heater and closing a low-temperature seal gas flow path diverged from a low-temperature portion of the heater flow path so that at least part of carbon dioxide heated by the high-temperature portion of the heater is capable of being supplied to a dry gas seal portion of a compressor and is capable of being used as a seal gas, and measuring temperature of carbon dioxide on the low-temperature seal gas flow path and when the measured temperature is equal to or higher than a predetermined setting temperature, closing the high-temperature seal gas flow path and opening the low-temperature seal gas flow path so that part of carbon dioxide heated by the low-temperature portion of the heater is capable of being supplied to the dry gas seal portion of the compressor.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, embodiments of the present invention will be described in detail with reference to the attached drawings.

Figure 1:
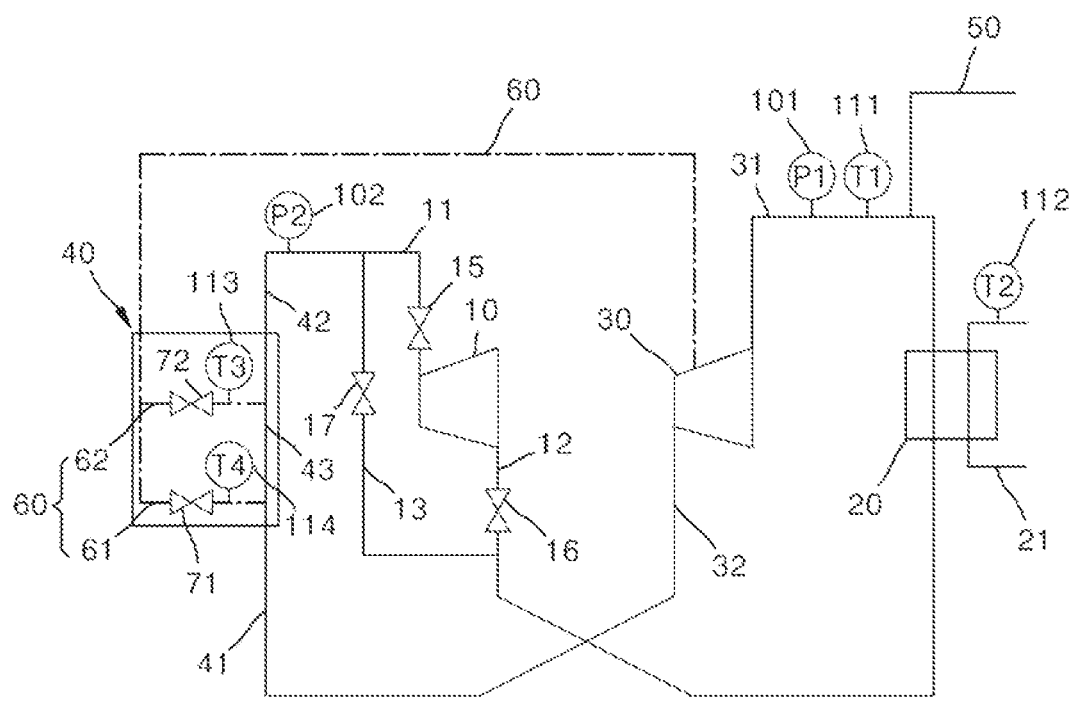
FIG. 1 is a schematic view illustrating a configuration of a supercritical carbon dioxide power generation system including a dry gas seal according to an embodiment of the present invention.

Referring to FIG. 1, a supercritical carbon dioxide power generation system including a dry gas seal according to an embodiment of the present invention includes a turbine 10, a cooler 20, a compressor 30, a heater 40, and a controller (not shown).

Supercritical carbon dioxide (S—$CO_2$) at a critical temperature or higher heated by the heater 40 is supplied to the turbine 10, and the turbine 10 undergoes an expansion procedure and is driven to produce a work.

An intake side of the turbine 10 and a discharge side of the heater 40 are connected to each other via a turbine intake flow path 11. A turbine discharge flow path 12 is connected to a discharge side of the turbine 10.

A turbine intake valve 15 is installed on the turbine intake flow path 11. A turbine discharge valve 16 is installed on the turbine discharge flow path 12.

A turbine bypass flow path 13 is diverged from the turbine intake flow path 11. The turbine bypass flow path 13 is diverged from the turbine intake flow path 11, is connected to the turbine discharge flow path 12 and guides carbon dioxide generated in the heater 40 to bypass the turbine 10. A turbine bypass valve 17 is installed on the turbine bypass flow path 13.

The cooler 20 cools carbon dioxide generated in the turbine 10 by using coolant. A coolant flow path 21 is connected to the cooler 20.

A coolant temperature sensor 112 for measuring the temperature of coolant is installed on the coolant flow path 21.

A compressor intake flow path 31 is connected to an intake side of the compressor 30, and a compressor discharge flow path 32 is connected to a discharge side of the compressor 30.

A compressor intake pressure sensor 101 for measuring the pressure of carbon dioxide flowing into the compressor 30 and a compressor intake temperature sensor 111 for measuring the temperature of carbon dioxide flowing into the compressor 30 are installed on the compressor intake flow path 31.

A carbon dioxide injecting portion 50 is connected to the compressor intake flow path 31 and injects carbon dioxide as a working fluid from a carbon dioxide tank (not shown) into the compressor 30.

A heater intake flow path 41 is connected to an intake side of the heater 40, and a heater discharge flow path 42 is connected to the discharge side of the heater 40, and a heater flow path 43 is provided inside the heater 40 and connects the heater intake flow path 41 to the heater discharge flow path 42.

The heater intake flow path 41 is connected to the compressor discharge flow path 32. The heater discharge flow path 42 is connected to the turbine intake flow path 11.

A heater discharge pressure sensor 102 for measuring a discharge pressure of carbon dioxide heated by the heater 40 is provided on the heater discharge flow path 42.

At least one or more seal gas flow paths 60 are diverged from the heater flow path 43.

The seal gas flow path 60 is a flow path, which is diverged from the heater flow path 43 and guides at least part of carbon dioxide heated by the heater 40 to bypass, to be injected into a dry gas seal portion (not shown) of the compressor 30 and to be used as a seal gas.

The dry gas seal portion (not shown) of the compressor 30 is provided between an impeller and a bearing of the compressor 30 and is a thin layer to be formed by the seal gas when the seal gas is supplied onto a surface between a stator and a rotor.

The seal gas flow path 60 includes a low-temperature seal gas flow path 61 and a high-temperature seal gas flow path 62. In the present embodiment, an example in which there are two seal gas flow paths 60, will be described. However, embodiments of the present invention are not limited thereto, and of course, the number of seal gas flow paths may be two or more.

The low-temperature seal gas flow path 61 is diverged from a position closer to the intake side of the heater flow path 43 than the high-temperature seal gas flow path 62 inside the heater 40.

A low-temperature seal gas valve 71 and a low-temperature seal gas temperature sensor 114 are installed on the low-temperature seal gas flow path 61.

Because the high-temperature seal gas flow path 62 is diverged from a downstream side of the heater flow path 43 compared to the low-temperature seal gas flow path 61 and thus has a high heat exchange rate, a higher temperature seal gas can be supplied on the high-temperature seal gas flow path 62.

A high-temperature seal gas valve 72 and a high-temperature seal gas temperature sensor 113 are installed on the high-temperature seal gas flow path 62.

The controller (not shown) controls operations of the turbine intake valve 15, the turbine discharge valve 16, the turbine bypass valve 17, the low-temperature seal gas valve 71, and the high-temperature seal gas valve 72.

The turbine intake valve 15, the turbine discharge valve 16, the turbine bypass valve 17, the low-temperature seal gas valve 71, and the high-temperature seal gas valve 72 are flow rate control valves.

A method of injecting carbon dioxide of a supercritical carbon dioxide power generation system including a dry gas seal having the above configuration according to an embodiment of the present invention will be described as below.

First, after the whole of internal air of the system is removed and evacuated, the controller (not shown) executes an initial driving mode of the system.

Figure 2:
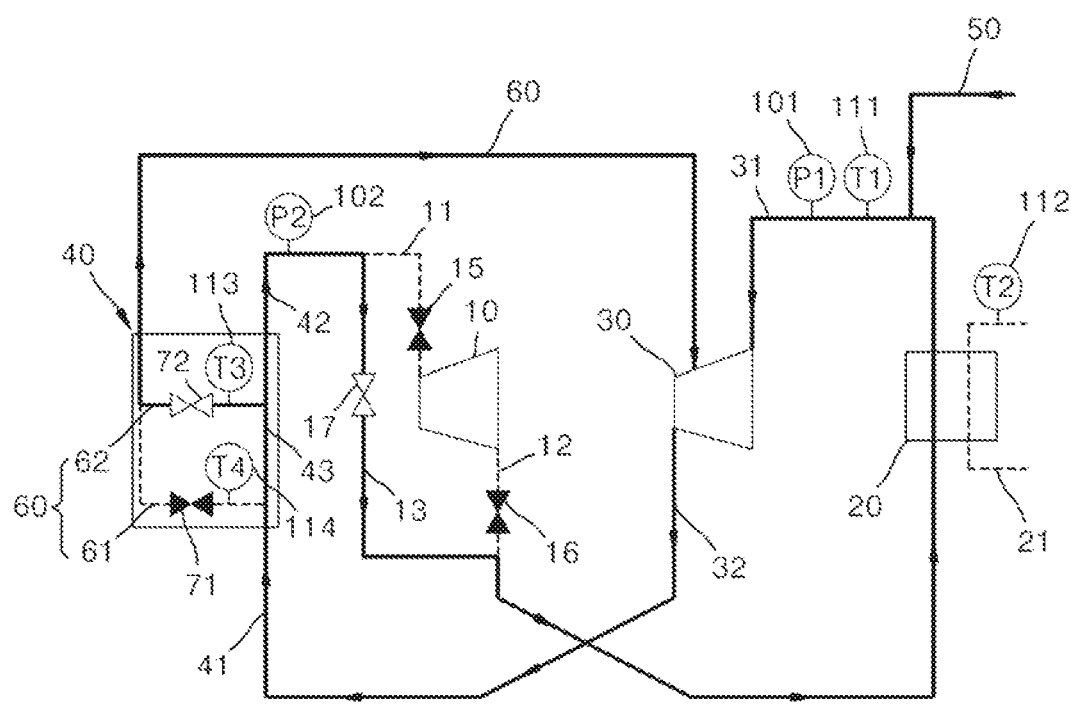
FIG. 2 is a view illustrating an initial driving mode of the supercritical carbon dioxide power generation system including a dry gas seal illustrated in FIG. 1.

Referring to FIG. 2, in the initial driving mode, carbon dioxide is slowly injected by using the carbon dioxide injecting portion 50, and the compressor 30 and the heater 40 are operated, and the turbine 10 and the cooler 20 are not operated.

The controller (not shown) opens the turbine bypass flow path 13 so that carbon dioxide heated by the heater 40 may bypass the turbine 10 and may circulate in the compressor 30.

In this case, an opening degree of the turbine bypass valve 17 is controlled so that the temperature and pressure of carbon dioxide circulating in the system can be slowly increased.

Also, the controller (not shown) closes the low-temperature seal gas valve 71 and opens only the high-temperature seal gas valve 72 because the heater 40 is not sufficiently pre-heated.

When the high-temperature seal gas valve 72 is opened, part of carbon dioxide heated by a high-temperature portion of the heater 40 is supplied to a dry gas seal portion of the compressor 30 via the high-temperature seal gas flow path 62. That is, carbon dioxide heated by the high-temperature portion of the heater 40 can be used as a seal gas. In this case, the flow rate of carbon dioxide supplied as the seal gas via the high-temperature seal gas valve 72 may be controlled to about 3% of a main flow rate. Here, the main flow rate is a flow rate on the heater discharge flow path 42. The flow rate of the seal gas and the main flow rate are monitored so that an optimum flow rate of the main flow rate can be controlled.

In addition, carbon dioxide supplied as the seal gas needs to be maintained in a gaseous state. The temperature of the low-temperature seal gas temperature sensor 114 and the temperature of the high-temperature seal gas temperature sensor 113 are measured so that it may be checked whether carbon dioxide is in the gaseous state or not.

Carbon dioxide for a seal supplied to the dry gas seal portion of the compressor 30 is discharged to the outside later. However, embodiments of the present invention are not limited thereto, and of course, carbon dioxide for the seal may be recovered and re-injected.

While the compressor 30 is being slowly driven, an intake pressure of carbon dioxide is measured by the compressor intake pressure sensor 101, and an intake temperature of carbon dioxide is measured by the compressor intake temperature sensor 111 so that carbon dioxide to be taken in the compressor 30 can be maintained in the gaseous state.

Also, the pressure of carbon dioxide discharged from the heater 40 is measured by the heater discharge pressure sensor 102, and the temperature of carbon dioxide is measured by the low-temperature seal gas temperature sensor 114 and the high-temperature seal gas temperature sensor 113 so that carbon dioxide can be maintained in the gaseous state.

Subsequently, when the discharge temperature of the heater 40 and the discharge pressure of the heater 40 satisfy a predetermined condition, the controller (not shown) may determine that the heater 40 is sufficiently pre-heated and may convert a current mode into a turbine-driving mode. Here, temperature measured by the high-temperature seal gas temperature sensor 113 is used as the discharge temperature of the heater 40.

Figure 3:
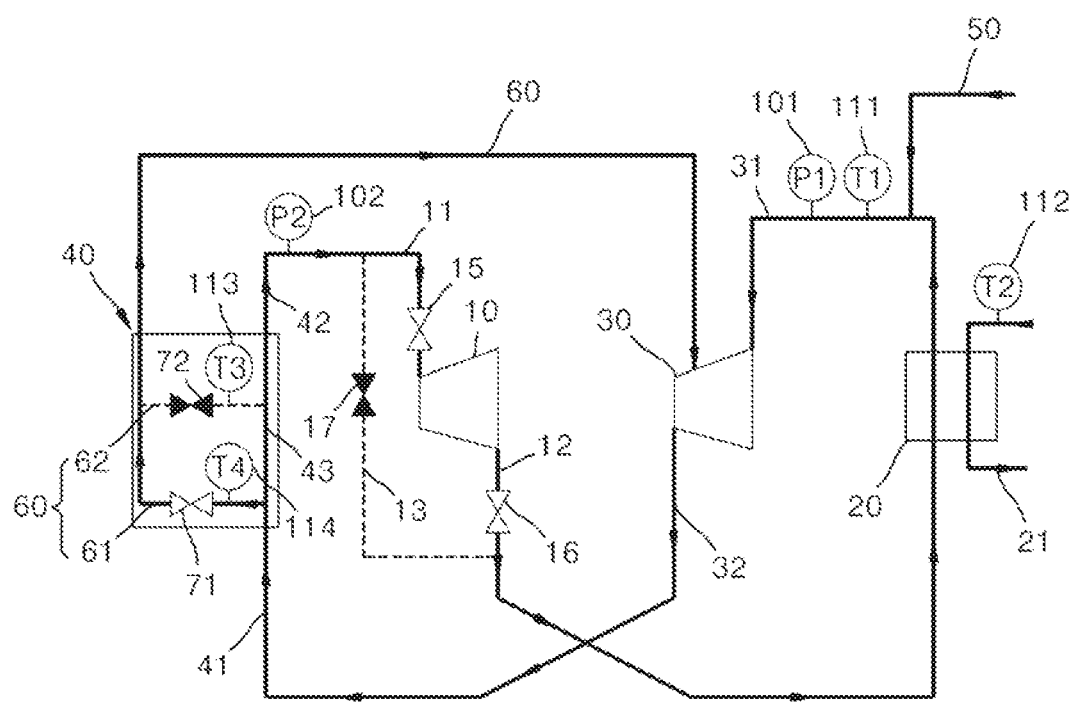
FIG. 3 is a view illustrating a turbine-driving mode of the supercritical carbon dioxide power generation system including a dry gas seal illustrated in FIG. 1.

Referring to FIG. 3, in the turbine-driving mode, the turbine 10 and the cooler 20 are operated, and the turbine bypass valve 17 and the high-temperature seal gas valve 72 are closed, and the low-temperature seal gas valve 71 is opened.

When the temperature of carbon dioxide on the low-temperature seal gas flow path 61 is equal to or higher than a predetermined setting temperature, the high-temperature seal gas flow path 62 is closed, and the low-temperature seal gas flow path 61 is opened. In the present embodiment, an example in which only one of the high-temperature seal gas valve 72 and the low-temperature seal gas valve 71 is opened, has been described. However, embodiments of the present invention are not limited thereto, and of course, all of the high-temperature seal gas valve 72 and the low-temperature seal gas valve 71 are opened so that the amount of an opening degree of each of the high-temperature seal gas valve 72 and the low-temperature seal gas valve 71 can be controlled to control temperature.

Thus, part of carbon dioxide heated by the heater 40 is supplied to the dry gas seal portion of the compressor 30 via the low-temperature seal gas flow path 61. Because the heater 40 is sufficiently pre-heated, carbon dioxide heated by a low-temperature portion of the heater 40 can be used as the seal gas. When the turbine 10 is driven, the temperature of the seal gas is 100° C. or higher.

In this case, the flow rate of carbon dioxide supplied as the seal gas via the low-temperature seal gas valve 71 may be controlled to about 3% of the main flow rate.

Also, carbon dioxide supplied as the seal gas needs to be maintained in the gaseous state, and the temperature of the low-temperature seal gas temperature sensor 114 is measured so that it may be checked whether carbon dioxide is in the gaseous state or not.

In the turbine-driving mode, the turbine bypass flow path 13 is closed, and the turbine intake flow path 11 is opened so that carbon dioxide generated in the heater 40 can be supplied into the turbine 10 and the turbine 10 can be driven.

Also, the temperature of coolant is controlled so that an intake temperature and an intake pressure of carbon dioxide to be taken in the compressor 30 can be controlled in a supercritical state.

Thus, part of carbon dioxide heated by the heater 40 is supplied to the dry gas seal portion of the compressor 30 so that the seal gas does not need to be additionally supplied. Also, when the seal gas is additionally supplied, a device for heating and pressurizing the seal gas at a predetermined temperature and under a predetermined pressure is required. However, since, in the present invention, part of carbon dioxide circulating in the system is used, an additional heating/pressurizing device is not required.

As described above, according to the present invention, part of carbon dioxide heated by a heater is supplied to a dry gas seal portion of a compressor so that a device for pressurizing and heating a seal gas is not additionally required, configuration can be simplified and cost can be reduced.

In addition, a seal gas flow path includes a low-temperature seal gas flow path and a high-temperature seal gas flow path so that, in an initial driving mode, carbon dioxide heated by a high-temperature portion of the heater is used as a seal gas and in a turbine-driving mode, carbon dioxide heated by a low-temperature portion of the heater is used as a seal gas and thus a more efficient operation can be performed.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A supercritical carbon dioxide power generation system including a dry gas seal, comprising:
   a turbine;
   a cooler;
   a compressor;
   a heater;
   a carbon dioxide injecting portion injecting carbon dioxide as a working fluid from a carbon dioxide tank into an intake side of the compressor;
   a heater flow path provided in the heater and configured to introduce and heat the carbon dioxide received from the compressor and then to discharge the carbon dioxide to the turbine;
   a seal gas flow path diverged from the heater flow path and guiding at least part of the carbon dioxide heated on the heater flow path to be injected into a dry gas seal portion of the compressor and to be used as a seal gas;
   a seal gas valve installed on the seal gas flow path and opening/closing of the seal gas flow path; and
   a controller controlling an amount of an opening degree of the seal gas valve according to temperature of the carbon dioxide heated by the heater,
   wherein the seal gas flow path comprises:
     a low-temperature seal gas flow path diverged from the heater flow path; and
     a high-temperature seal gas flow path diverged from a downstream side of the heater flow path compared to the low-temperature seal gas flow path, and
   wherein the seal gas valve comprises:

a low-temperature seal gas valve installed on the low-temperature seal gas flow path; and a high-temperature seal gas valve installed on the high-temperature seal gas flow path.

2. The supercritical carbon dioxide power generation system including the dry gas seal of claim 1, wherein, in an initial driving mode in which injecting of the carbon dioxide from the carbon dioxide injecting portion into the compressor starts, the controller operates the heater, closes the low-temperature seal gas valve, and opens the high-temperature seal gas valve so that the at least part of the carbon dioxide heated by the heater is capable of being supplied to the dry gas seal portion of the compressor via the high-temperature seal gas flow path.

3. The supercritical carbon dioxide power generation system including the dry gas seal of claim 1, further comprising a low-temperature seal gas temperature sensor installed on the low-temperature seal gas flow path, wherein, when temperature sensed by the low-temperature seal gas temperature sensor is equal to or higher than first predetermined setting temperature, the controller closes the high-temperature seal gas valve and opens the low-temperature seal gas valve so that the carbon dioxide heated by the heater is capable of being supplied to the dry gas seal portion of the compressor via the low-temperature seal gas flow path.

4. The supercritical carbon dioxide power generation system including the dry gas seal of claim 1, further comprising:

a turbine intake flow path connecting the heater to the turbine;

a turbine bypass flow path diverged from the turbine intake flow path and guiding the carbon dioxide generated in the heater to bypass the turbine and to move to a discharge side of the turbine; and a turbine bypass valve installed on the turbine bypass flow path and opening the turbine bypass flow path before the turbine is driven.

5. The supercritical carbon dioxide power generation system including the dry gas seal of claim 4, wherein, in an initial driving mode in which injecting of the carbon dioxide from the carbon dioxide injecting portion into the compressor starts, the controller operates the heater, closes the low-temperature seal gas valve, and opens the high-temperature seal gas valve so that the at least part of the carbon dioxide heated by the heater is capable of being supplied to the dry gas seal portion of the compressor via the high-temperature seal gas flow path, and the controller opens the turbine bypass flow path so that remaining part of the carbon dioxide heated by the heater is capable of being supplied to the compressor via the turbine bypass flow path.

6. The supercritical carbon dioxide power generation system including the dry gas seal of claim 1, further comprising:

a high-temperature seal gas temperature sensor installed on the high-temperature seal gas flow path; and a heater discharge pressure sensor provided on a heater discharge flow path, wherein the high-temperature seal gas temperature sensor measures discharge temperature of the heater and the heater discharge pressure sensor measures discharge pressure of the heater.

7. The supercritical carbon dioxide power generation system including the dry gas seal of claim 6, wherein, in a turbine-driving mode in which the discharge temperature of the heater and the discharge pressure of the heater satisfy predetermined conditions and the turbine is operated, the controller closes a turbine bypass flow path and opens a turbine intake flow path so that the carbon dioxide heated by the heater is supplied to the turbine.

8. A method of controlling a supercritical carbon dioxide power generation system including a dry gas seal, the method comprising:

in an initial driving mode in which injecting of carbon dioxide from a carbon dioxide injecting portion into a compressor starts, operating a heater;

opening a high-temperature seal gas flow path diverged from a high-temperature portion of a heater flow path that passes through the heater and closing a low-temperature seal gas flow path diverged from a low-temperature portion of the heater flow path so that at least part of the carbon dioxide heated by the high-temperature portion of the heater is capable of being supplied to a dry gas seal portion of the compressor and is capable of being used as a seal gas; and measuring temperature of the carbon dioxide on the low-temperature seal gas flow path and when the measured temperature is equal to or higher than predetermined setting temperature, closing the high-temperature seal gas flow path and opening the low-temperature seal gas flow path so that part of the carbon dioxide heated by the low-temperature portion of the heater is capable of being supplied to the dry gas seal portion of the compressor.

9. The method of claim 8, wherein, in the initial driving mode, a turbine bypass flow path on which the carbon dioxide generated in the heater flow path bypasses the turbine, is opened so that carbon dioxide that is not discharged onto the low-temperature seal gas flow path and the high-temperature seal gas flow path of the carbon dioxide heated by the heater is capable of bypassing a turbine and circulating in the compressor.

10. The method of claim 8, wherein, in the initial driving mode, discharge temperature of the heater and discharge pressure of the heater are measured, and when the discharge temperature of the heater and the discharge pressure of the heater satisfy predetermined condition, a current mode is converted into a turbine-driving mode in which a turbine is driven.

11. The method of claim 10, wherein, in the turbine-driving mode, a turbine bypass flow path is closed, and a turbine intake flow path connecting the heater to the turbine is opened so that carbon dioxide that is not discharged to the low-temperature seal gas flow path and the high-temperature seal gas flow path of the carbon dioxide heated by the heater is capable of being supplied to the turbine.

* * * * *